United States Patent [19]
Lippert et al.

[11] 3,920,049
[45] Nov. 18, 1975

[54] FIBER-REINFORCED PLASTICS TUBE

[75] Inventors: Axel Lippert; Siegfried Joisten; Johannes-Otto Sajben, all of Krefeld, Germany

[73] Assignee: Bayer Aktiengesellschaft, Leverkusen, Germany

[22] Filed: Jan. 16, 1973

[21] Appl. No.: 324,043

[30] Foreign Application Priority Data
Jan. 18, 1972 Germany............................ 2202125

[52] U.S. Cl. ........... 138/109; 138/126; 138/DIG. 7; 285/403
[51] Int. Cl.² ................... F16L 09/12; F16L 11/02; F16L 11/04
[58] Field of Search ........... 138/125, 129, 144, 172; 285/229, 403

[56] References Cited
UNITED STATES PATENTS

| | | | |
|---|---|---|---|
| 1,696,435 | 12/1928 | Fraley | 285/229 |
| 2,752,952 | 7/1956 | Dauphinais | 138/53 |
| 2,783,173 | 2/1957 | Walker et al. | 138/144 X |
| 2,862,524 | 12/1958 | Smith | 138/144 |
| 3,037,798 | 6/1962 | Cooper | 138/126 X |
| 3,093,160 | 6/1963 | Boggs | 138/125 X |
| 3,104,839 | 9/1963 | Krupp et al. | 138/144 |
| 3,305,251 | 2/1967 | Skinner | 285/229 |
| 3,365,203 | 1/1968 | Wallis | 138/125 X |
| 3,654,967 | 4/1972 | Atwell | 138/144 |
| 3,812,885 | 5/1974 | Sajben et al. | 138/125 |

Primary Examiner—Richard C. Queisser
Assistant Examiner—Daniel M. Yasich
Attorney, Agent, or Firm—Burgess, Dinklage & Sprung

[57] ABSTRACT

A plastics tube comprises a duroplastic material with a fiber reinforcement of at least one tubular, endless knitted fabric impregnated with the duroplastic material, wherein the ends of the tube are provided with flanges, the endless tubular knitted fabric extending radially outwards into the flange and being impregnated with a circular insert.

8 Claims, 3 Drawing Figures

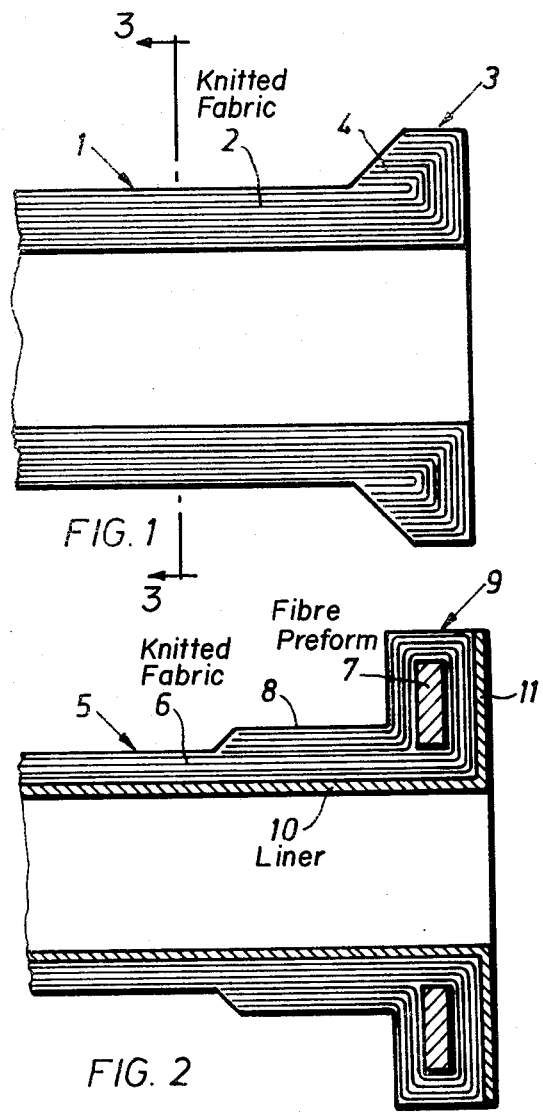

FIBER-REINFORCED PLASTICS TUBE

This invention relates to a fibre-reinforced plastics tube which is or is not provided with an inner liner which consists of a duroplastic material with a fibre reinforcement of at least one tubular, endless knitted fabric impregnated with the duroplastic material.

A plastic tube can be produced by coating a core or an inner liner with duroplastic material in free flowing form, whereafter a reinforcement is applied to and impregnated by the duroplastic coating, and the duroplastic material is subsequently hardened, the fibre reinforcement being produced by knitting the core or inner liner.

A plastic tube formed by such a process is disclosed in an application of two of us, assigned to the assignee hereof U.S. Ser. No. 184,844, filed Sept. 29, 1971 of Sajben et al., now U.S. Pat. No. 3,812,885.

The object of the invention is to provide a tube of this kind with flanges and to develop a process for producing a flanged plastics tube of this kind.

It would be possible to apply flanges where required to the tube section in the usual way by lamination or bonding. However, it has been found in practice, particular in the case of high-strength tubes, that this type of connection between tube section and flange fails much earlier than the tubes themselves.

Accordingly, one particular feature of the objective referred to above is to provide a flanged plastic tube in which the flanges are at least as strong as the tube section itself.

According to the present invention, there is provided a fibre-reinforced plastics tube, comprising a duroplastic material with a fibre reinforcement of at least one tubular, endless knitted fabric impregnated with the duroplastic material, wherein the ends of the tube are provided with flanges, the endless tubular knitted fabric extending radially outwards into the flange and being impregnated with a duroplastic material. In this way, the tube section merges directly with the flange. In general, several layers of knitted fabric are provided, the arrangement being for example that the outermost layer of knitted fabric is first folded over at its end so that the overlap rests on the outermost layer of knitted fabric itself, after which the underlying layers of knitted fabric, looking from outside to inside, are each folded back over the preceding layer so that, in the flange itself, the innermost layer of knitted fabric lies the furthest outside. This is quite possible because, by virtue of its elasticity, the knitted fabric is resilient. The entire assembly is impregnated with a duroplastic material which is preferably the same as that of the tube section.

In one particular embodiment of the plastics tube according to the invention, that part of the knitted fabric which extends radially outwards is backed by a circular insert. This increases the strength of the flange.

The knitted fabric preferably surrounds the insert so that the insert is locked in by the knitted fabric. Particularly high strengths are obtained in this way.

Where an insert is used, it preferably consists of a fabric or fibre preform which is impregnated with duroplastic material. Alternatively, it is possible to use inserts of solid materials such as metals or plastics.

According to the present invention, there is also provided a process for producing a fibre-reinforced plastics tube, wherein a core or inner liner is continuously knitted and coated with a duroplastic material in free flowing form, and the duroplastic material is subsequently hardened, the application of duroplastic material to the core or inner liner being halted at intervals for periods which, allowing for the particular rate of production of the core or liner, correspond to the period of time in which a piece of knitted fabric sufficient for the production of two flanges is produced, the uncoated piece of knitted fabric being cut in the middle and flanges being formed one at a time in a separate operation in which the knitted fabric is stretched radially outwards and impregnated with duroplastic material which hardens, the surplus inner liner present, if any, optionally having been cut off beforehand.

It is possible in this way to obtain a particularly rational and simple method of production which guarantees the production of high-strength flanges.

In cases where the flange surfaces are required to consist of the same material as the inner liner, if an inner liner is present, it is possible in accordance with the process to radially stretch an elastic inner liner before impregnation of the knitted fabric of the flange to be produced.

To produce flanges with reinforcing inserts, it is possible in accordance with the process for a circular insert to be pushed onto the knotted fabric and for the projecting piece of fabric to be folded at least partly circularly over the insert. This is possible through the elasticity of the knitted fabric and, at the same time, provides for the firm holding of the insert. In one particularly favourable embodiment, the knitted fabric is drawn completely over the insert until it rests on the outer wall of the already produced tube. In this way, the flange formed onto the tube has a relatively large connecting surface with the end of the tube so that it is much more difficult to break off. In these embodiments as well, the knitted fabric and optionally the insert, providing it consists of a fabric or fibre preform, are of course also impregnated with the duroplastic material.

Just as in the production of a plastics tube, unsaturated reactive polyester resins and reactive epoxide resins, for example, are used as the duroplastic materials. The knitted fabric and also the circular inserts, if any, preferably consist of carbon fibres, reed fibres, synthetic fibres based on polyamide or polyvinyl chloride for example. Fine-denier metallic fibres are also suitable.

Two ends of the flanged plastics tube according to the invention are shown purely diagrammatically in section in the accompanying drawings, wherein:

FIG. 1 shows a tube end having a flange without an insert.

FIG. 2 shows a tube end having a flange with an insert.

FIG. 3 is a cross section taken on line 3—3 in FIG. 1.

FIG. 1 shows the end of a tube 1 reinforced by tubular layers 2 of seamless knitted fabric. These layers of knitted fabric are folded back radially outwards in the vicinity of a flange 3, each forming an overlap 4.

FIG. 2 shows the end of a tube 5 which is reinforced by tubular seamless knitted fabric 6 which are drawn around an insert 7 into contact with the outer surface of the tube 5, reinforcing it at 8. A flange 9 is situated in the vicinity of the insert 7. The knitted fabric 6 and the insert 7 consist of a fibre preform and are impregnated with an epoxy resin which has been hardened.

An inner liner 10 which consists of rubber is provided to protect the epoxide resin against corrosive media flowing through the pipe, the inner liner 10 being folded or stretched radially outwards so that the flange surface 11 also consists of rubber, which is bonded to the epoxide resin.

As is shown in FIG. 3, tube 1 is composed of duroplastic material 12, having embedded therein knitted tube which form the layers 2.

What we claim:

1. A fibre-reinforced plastic tube, comprising a duroplastic material with a fibre reinforcement composed of at least one tubular, seamless knitted fabric impregnated with the duroplastic material, wherein the ends of the tube are provided with flanges, the tubular knitted fabric extending radially outwards in a plane substantially perpendicular to the axis of the tube, a circular insert disposed concentrically about said tube and laid up on, and forming a backing and support for the part of the knitted fabric which extends radially outwardly, the radially outwardly extending knitted fabric, being impregnated with a duroplastic material, the radially outwardly extending fabric, its impregnating material, and the circular insert being combined to form the flange.

2. A plastic tube as claimed in claim 1 wherein the knitted fabric extends beyond the circular insert and surrounds the insert, and the last mentioned extension of the knitted fabric is also impregnated with a duroplast material and forms part of the flange.

3. A plastic tube as claimed in claim 2, wherein the insert comprises of a fabric or fibre preform and is impregnated with the duroplastic material.

4. A plastic tube as claimed in claim 1, wherein the insert consists of a fabric or fibre preform and is impregnated with the duroplastic material.

5. A plastic tube according to claim 1 comprising an inner liner.

6. A plastic tube according to claim 1, the tube comprising a plurality of said tubular, knitted fabrics arranged in layers and impregnated with said duroplast material, a plurality of the knitted fabrics extending radially outwards in planes substantially perpendicular to the axis of the tube, said circular insert backing and supporting the part of the knitted fabrics which extend radially outwardly, the radially outwardly extending knitted fabrics being impregnated with the duroplast material, and with the impregnating material and the insert forming the flange.

7. A plastic tube according to claim 1, the radially outwardly extending fabric extending substantially over the entire radial width of the flange.

8. A plastic tube according to claim 6, the radially outwardly extending fabrics extending substantially over the entire radial width of the flange.

* * * * *